US006390014B1

(12) United States Patent
Ghidini

(10) Patent No.: US 6,390,014 B1
(45) Date of Patent: May 21, 2002

(54) ACOUSTIC SIGNALING DEVICE FOR CULINARY-USE VESSELS, IN PARTICULAR FOR KETTLES

(75) Inventor: Tiziano Ghidini, Lumezzane S..A. Brescia (IT)

(73) Assignee: Frabosk Casalinghi, S.P.A., Brescia (IT)

( * ) Notice: Subject to any disclaimer, the term of this patent is extended or adjusted under 35 U.S.C. 154(b) by 0 days.

(21) Appl. No.: 09/619,803

(22) Filed: Jul. 20, 2000

(30) Foreign Application Priority Data

Sep. 24, 1999 (EP) ........................................... 99830606

(51) Int. Cl.[7] ............................ G10K 1/00; G10K 1/10

(52) U.S. Cl. ...................... 116/150; 116/101; 116/148; 222/39

(58) Field of Search ................................ 116/101, 169, 116/137 R, 148, 142 FP, 151, 152, 155, 67 R, 150; 220/573.1, 912; D7/302; 222/39; 137/213

(56) References Cited

U.S. PATENT DOCUMENTS 1,161,713 A * 11/1915 Madsen ....................... 116/70
2,692,573 A * 10/1954 Bakal ....................... 116/67 R
4,137,832 A * 2/1979 Lambros ...................... 99/285
4,385,585 A * 5/1983 Lebowitz .................. 116/67 R
4,466,327 A * 8/1984 Hinton ....................... 84/95 C
4,813,368 A * 3/1989 Hutter, III et al. ........ 116/67 R
4,873,918 A * 10/1989 Goldman ..................... 99/403
D343,328 S * 1/1994 Ancona et al. .............. D7/302
5,441,039 A * 8/1995 Yeh ............................ 126/388
6,102,240 A * 8/2000 Haas et al. ............. 220/573.1

FOREIGN PATENT DOCUMENTS

GB 2313482 A * 11/1997

* cited by examiner

*Primary Examiner*—Diego Gutierrez
*Assistant Examiner*—Lydia M. De Jesus
(74) *Attorney, Agent, or Firm*—Robert F. I. Conte; Lee, Mann, Smith, McWilliams, Sweeney & Ohlson

(57) ABSTRACT

An acoustic signalling device for containers destined for culinary use, in particular for boilers, is proposed, comprising a nozzle (11) able to convey externally to a container able to be closed (2) whereto the device is associated a steam jet formed inside the same container, a sounding body (12) fastened to a portion of the container able to be closed (2) and a movable element (13) positioned in the trajectory of the steam jet and able repeatedly to strike the sounding body (12) under the thrust of the same steam jet.

6 Claims, 3 Drawing Sheets

1
5
6
7a
12
8
9
13
2
7
4
3

12
7a
13
13b
13a
6
8
11
9
7b
10
11a
7
4
2

ACOUSTIC SIGNALING DEVICE FOR CULINARY-USE VESSELS, IN PARTICULAR FOR KETTLES

FIELD AND BACKGROUND OF THE INVENTION

The present invention relates to an acoustic signalling device for a container destined for culinary use, in particular for boilers.

As is well known, to some types of containers for culinary use, for instance to boilers destined to heat and bring to a boil the water necessary for the preparation of tea, infusions or other drinks, are often associated acoustic signalling devices that allow to alert the user when the water has reached its boiling temperature.

Known acoustic signalling devices generally comprise valves applied to the containers or to their lids and formed by different components generally also including resonance boxes whereinto the steam formed during the water boiling phase flows.

In practice, such known devices operate as whistles, i.e. emit a high-pitched, shrill hissing sound produced by the steam travelling through them.

The prior art summarily described above presents numerous limitations and drawbacks.

First of all, the aforementioned whistle devices are rather complex from a constructive point of view and hence also present considerable manufacturing costs.

Moreover, they need to be disassembled periodically for cleaning because with use, the small orifices through which the steam flows tend to become clogged as a result of the incrustations and deposits due to the limestone present in the water. The disassembly and, above all, the assembly operations can be complex and difficult to carry out, at least for some categories of users. It is therefore possible for the devices not to be reassembled correctly in all their components and for some components to be detached accidentally and suddenly under the pressure of the steam, in practice being ejected as dangerous projectiles into the surrounding areas.

It should also be observed that known devices emit whistle-like acoustic signals with a rather unpleasant tone, easily confused with other similar sounds due, for instance, to the presence of pressure-cooking pots which occasionally are hard to hear at a certain distance, especially by persons who are partially impaired in their hearing ability at high frequencies.

SUMMARY OF THE INVENTION

In this situation, the technical task constituting the basis for the present invention is to devise an acoustic signalling device for containers destined for culinary use, in particular for boilers, able substantially to overcome the aforementioned drawbacks.

Within the scope of said technical task, an important aim of the invention is to obtain a very simple device from the constructive point of view, with reduced manufacturing cost.

Another important aim is to obtain a device which requires no periodic disassembly operations to be cleaned and which is always safe and reliable in its operation.

A last aim is to obtain an acoustic signalling device that produce a sound signal with a pleasant tone, certain to be recognised and easily heard even at a distance.

The technical task set out above and the specified aims are substantially reached by an acoustic signalling device for containers destined for culinary use, in particular for boilers comprising a nozzle able to convey externally to a container able to be closed, whereto the device is associated, a jet of steam formed inside the same container able to be closed, a sounding body fastened to a portion of said container able to be closed, and a movable element positioned in the trajectory of said steam jet and able repeatedly to strike said sounding body under the thrust of the steam jet itself.

BRIEF DESCRIPTION OF THE DRAWINGS

The description is now provided, purely by way of non-limiting example, of a preferred but not exclusive embodiment of an acoustic signalling device according to the invention, illustrated in the accompanying drawings wherein.

DESCRIPTION OF THE PREFERRED EMBODIMENT

Figure 1:
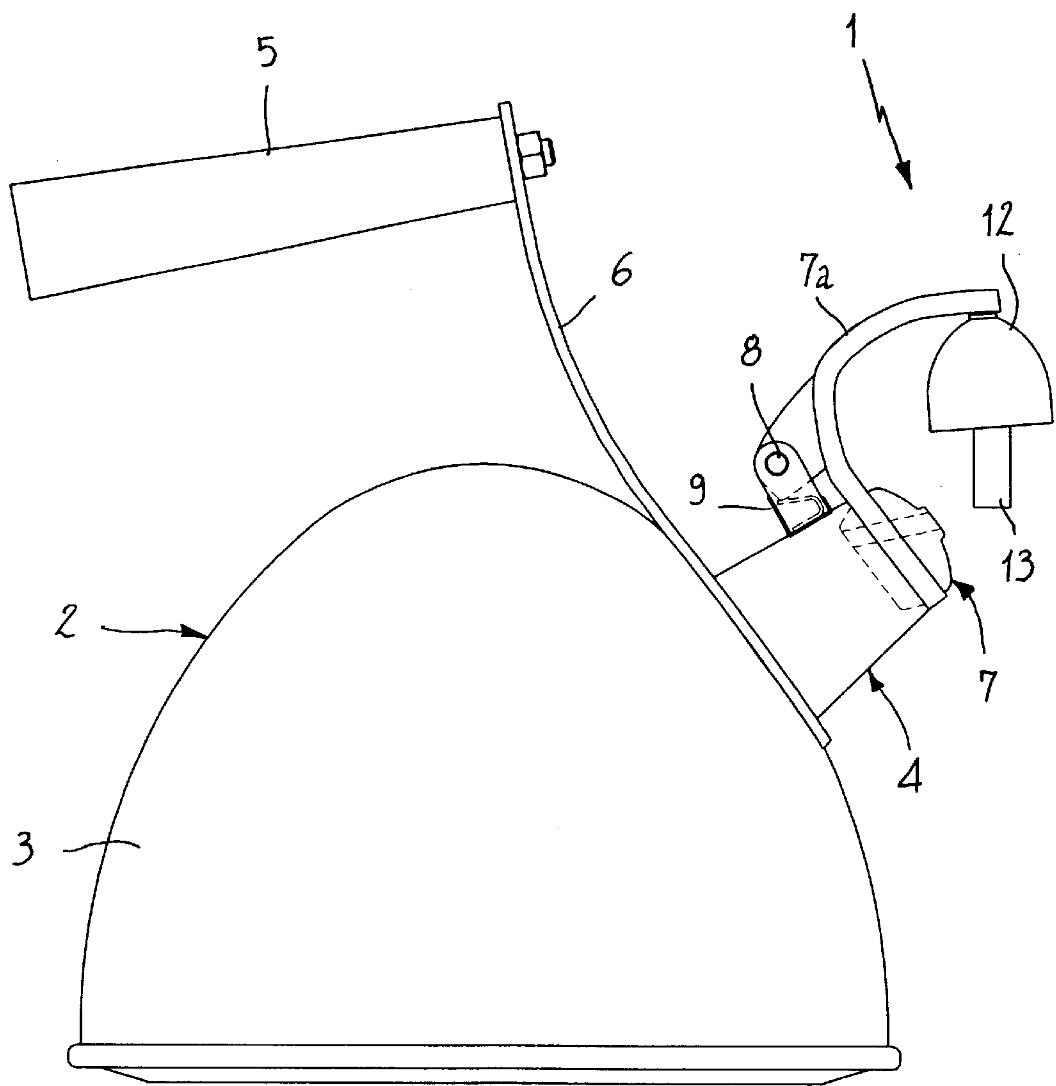
FIG. 1 shows a side elevation view, partially sectioned, of a boiler provided with an acoustic signalling device according to the invention associated to the overturning lid set in the position wherein it closes the spout of the boiler itself.

With reference to the aforementioned figures, the acoustic signalling device according to the invention is indicated in its entirety with the number 1.

It is associated to a boiler 2 of a conventional type, known in itself, comprising a cap-shaped container 3, a spout 4 engaged laterally and superiorly to the container 2, and a handle 5 connected to the outer surface of the cap-shaped container through a support element 6.

Figure 2:
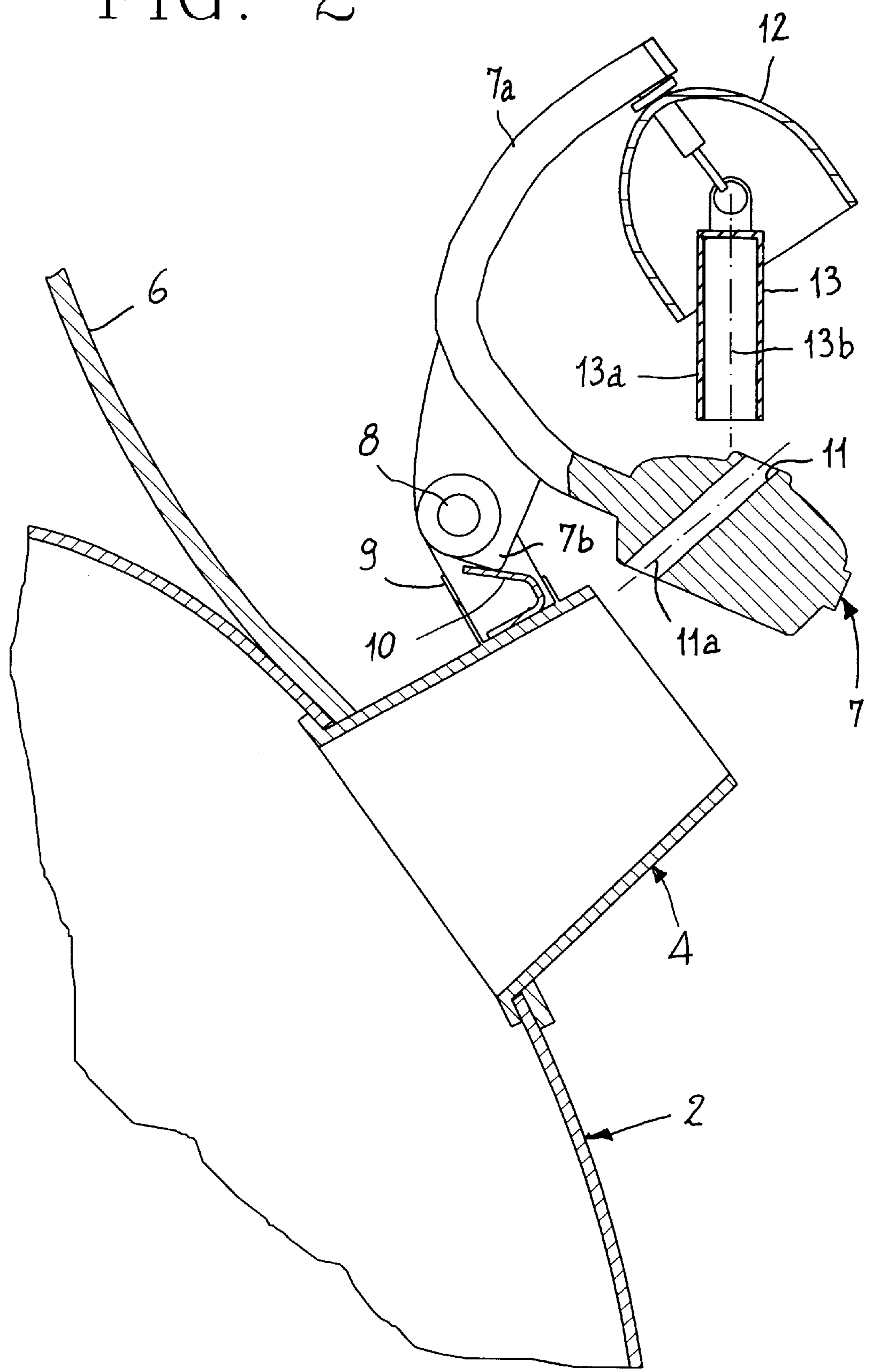
FIG. 2 shows a side view of the device and of the overturning lid in the open position.

On the spout 4 is hinged a lid 7 removable by means of a manoeuvring appendix 7*a* for instance with arched shape, between a stable closure condition, shown in FIG. 1, and a stable opened condition, shown in FIG. 2.

More specifically the stability of said two positions is obtained by means of the elasticity of a spring element 10 which interferes with a checking edge 7*b* of the lid 7 positioned in proximity to a pivot pin 8 inserted in appropriate expansions 9 of the spout 4.

Originally, the device 1 comprises a nozzle 11 obtained in the thickness of the lid 7 and able to convey outwards, in the direction of its central axis 11*a*positioned longitudinally, a jet of the steam that is formed inside the container 3 upon reaching the boiling temperature. Terminally to the manoeuvring appendix 7*a* is rigidly fastened a sounding body 12, advantageously constituted by a bell-shaped metallic element.

On the trajectory of the steam jet departing the nozzle 11 is positioned a movable element 13 able repeatedly to strike the sounding body 12 under the thrust of the steam jet itself. The movable element 13 is, in practice, constituted by a clapper, of substantially tubular shape, pivotingly engaged inside the bell element 12.

Preferably, the clapper 13 is defined by a substantially cylindrical shape.

More in detail: the clapper 13 comprises a terminal portion 13*a* projecting from the bell element 12; the central axis 11*a* of the nozzle 11 is positioned obliquely relative to the lid 7 in such a way as to orient the trajectory of the steam jet obviously into the area occupied by the terminal portion 13*a* of the clapper 13.

This disposition of the axis of the nozzle 11 prevents steam from entering the cavity of the bell element 12 causing undesired resonating effects and the like.

Figure 3:
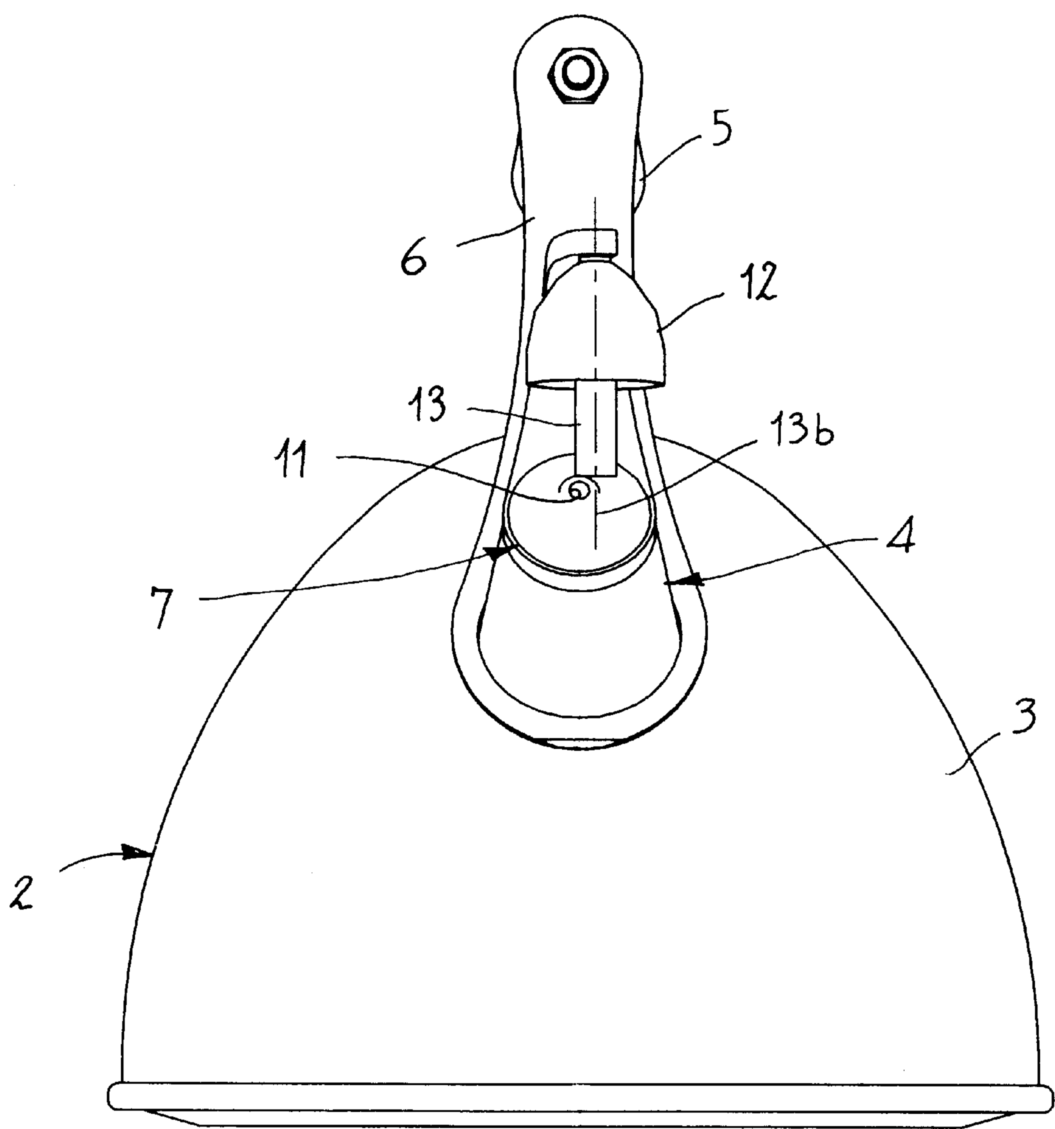
FIG. 3 shows a front view of the boiler and of the device of FIG. 1.

Moreover, to obtain a repeated oscillation of the clapper 13 under the thrust of the steam jet, the longitudinal direction of development 11*a* of the nozzle 11 and the longitudinal axis 13*b* of the clapper 13, when the clapper is in the vertical resting position, are situated on mutually distanced vertical plane so that the steam jet laterally invests the terminal portion 13*a* of the clapper 13 (see FIG. 3).

It is therefore possible, as soon as the steam jet is developed, for the clapper 13 to move laterally and to exit the area occupied by the jet, to strike the bell element to return to the area of the steam jet and be laterally thrust by the steam jet anew. If, on the contrary, the clapper in the resting position and the steam jet were aligned in the same vertical plane, the steam jet would thrust the clapper in such a plane against the bell element always maintaining it in that position of contact, i.e. not allowing the repeated oscillations required to produce the sound emission.

The invention attains important advantages.

The device according to the invention is formed by few, simple components and hence its cost is limited.

It should be stressed that it does not need to be disassembled, nor does it require any particular cleaning operations; the steam emitting nozzle, in particular, is not subject to clogging because its optimal dimensions to obtain a steam jet suitable to impart the oscillatory motion to the clapper of the device must be rather ample, as opposed to the reduced dimensions of the conduits necessary in the prior art to produce whistle-like sound emissions.

Lastly, it should be noted that the acoustic signal emitted by the device according to the invention presents a pleasant and soft sound timbre, easily distinguishable from other acoustic signals and easily perceptible by everyone.

What is claimed is:

1. An acoustic signaling device associated with a container destined for culinary use comprising:

a nozzle (1) closing said container and conveying externally from said container (2) a steam jet that, during use, is formed inside said container a sounding body (12) fastened to a portion of said container (2);

and a movable element (13) positioned in the trajectory of said steam jet and able to repeatedly strike said sounding body (12) under the thrust of the steam jet itself.

2. The device as claimed in claim 1, wherein said sounding body (12) is defined by a bell-shaped element and said movable element (13) is constituted by a clapper pivotingly engaged inside the bell-shaped element (12) itself.

3. The device as claimed in claim 2, wherein said clapper (13) comprises a terminal portion (13*a*) projecting from the bell-shaped element (12) and said nozzle (11) develops according to a longitudinal direction (11*a*) able to orient the trajectory of the steam jet externally to the bell-shaped element (12) in the area occupied by said terminal portion (13*a*) of the clapper (13).

4. The device as claimed in claim 3, wherein said longitudinal direction (11*a*) of development of the nozzle (11) and the longitudinal axis (13*b*) of the clapper (13) in vertical resting position are located on mutually distanced vertical planes so that said steam jet invests said terminal portions (13*a*) of the clapper (13) laterally.

5. The device as claimed in claim 2, wherein said clapper (13) presents substantially tubular shape.

6. The device as claimed in claim 5, wherein said clapper (13) with tubular shape is defined by a substantially cylindrical configuration.

* * * * *